Sept. 9, 1952         E. E. HOOD         2,609,712
TWO-SPEED GEARING FOR BICYCLES
Filed Jan. 22, 1951
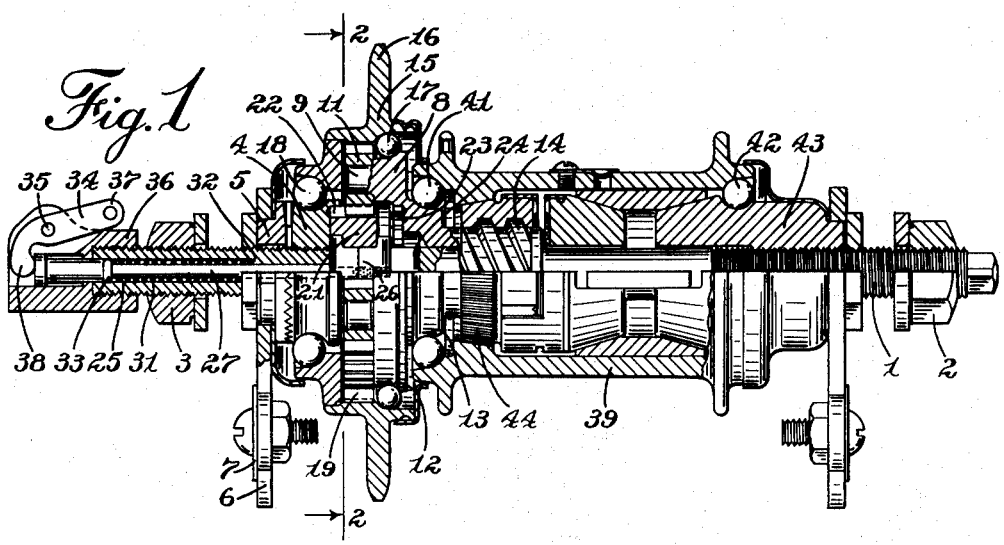
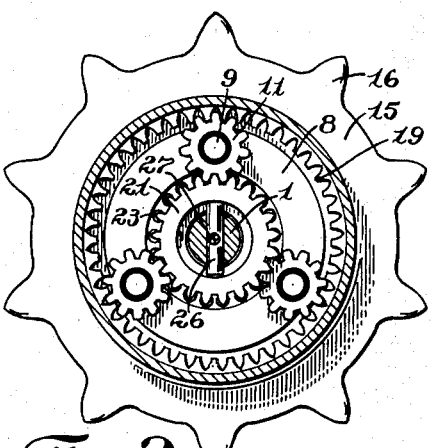
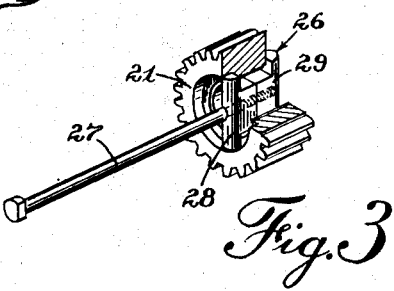
WITNESS:
Esther M. Stockton
INVENTOR.
E. Elliott Hood
BY
Clinton S. Janes
ATTORNEY Patented Sept. 9, 1952

2,609,712

UNITED STATES PATENT OFFICE 2,609,712

TWO-SPEED GEARING FOR BICYCLES

Edwin Elliott Hood, Elmira, N. Y., assignor to Bendix Aviation Corporation, a corporation of Delaware Application January 22, 1951, Serial No. 207,073

2 Claims. (Cl. 74—781)

The present invention relates to two-speed gearing for bicycles, and more particularly to a hill climbing gear attachment for bicycle coaster brakes.

It is an object of the present invention to provide a novel variable speed drive gear for bicycles which is strong and durable, efficient in operation, and simple in construction.

It is another object to provide such a device which comprises a self-contained unit for converting a commercial form of coaster brake, such as that illustrated in the patent to Hood Number 2,410,785, into a two-speed drive.

It is a further object to provide such a device comprising a planetary type of reduction gearing in which the driving forces are applied in the form of balanced couples, and the transmission elements are maintained in alignment by bearings located close to the points of application of the forces.

Further objects and advantages will be apparent from the following description taken in connection with the accompanying drawing in which:

Fig. 1 is a side elevation, partially broken away and in section showing a preferred embodiment of the invention;

Fig. 2 is a section taken substantially on the line 2—2 of Fig. 1; and

Fig. 3 is a detail in perspective of the sun gear and its shifting means, partially broken away and in section.

In Fig. 1 of the drawing there is illustrated an axle 1 adapted to be maintained in the fork of a bicycle frame not illustrated, and fixed therein by means of clamp nuts 2 and 3. An adjustable bearing member 4 is threaded on the axle and is provided with serrations or dentals adapted to engage similar dentals on an anchor member 5. An anchor arm 6 is non-rotatably mounted on the anchor member 5 and carries at its free end a clip 7 for attachment to the bicycle frame so as to immobilize the anchor member and the bearing member 4.

A transmission member 8, journalled on the axle 1, is provided with a plurality of studs 9 on which planetary pinions 11 are rotatably mounted. The transmission member 8, which thus performs the function of a planet carrier, is provided with bearing cones 12 and 13, and is threaded for a portion of its length as shown at 14.

A driving member 15 comprising a sprocket 16, is rotatably mounted on the planet carrier 8 by means of bearings 17, and on the bearing member 4 by means of bearings 18. The driving member has internal teeth 19 meshing with the planet pinions 11 and forming an orbit gear therefor.

A sun gear 21 (Fig. 3), is slidably journalled on the axle 1 and meshes with the planet pinions 11. The bearing member 4 and the planet carrier 8 are provided with internal teeth 22 and 23 respectively which are arranged to receive the teeth of the sun gear 21 and form a positive torque-transmitting connection therebetween when the sun gear is moved longitudinally along the axle 1 into engagement therewith.

The axle 1 has a cross slot 24 through that portion on which the sun gear is journalled, and has an axial bore 25 extending from the adjacent end of the axle to said slot. Means for shifting the sun gear axially are provided comprising a shift block 26 slidably received in the slot 24 and having a swivel connection with the sun gear 21.

As best shown in Fig. 3, the block 26 is preferably formed in two parts 28, 29, mounted on the end of a plunger 27 which traverses the bore 25 in axle 1. The part 28 seats against a shoulder on the plunger, and the part 29 is threaded on the end of the plunger, which thus clamps the two parts of the block together so as to loosely embrace the sun gear 21.

The plunger 27 is normally held in its outwardly shifted position as shown in Fig. 1 by means of a spring 31 bearing against an internal shoulder 32 in the axle 1 and an enlargement 33 of the plunger. A shift lever 34 is pivotally mounted on a bearing 35 in a cap member 36 threaded on the end of the axle, one end of the lever being formed as indicated at 37 for attachment of a suitable actuating cable, while the other end 38 engages the outer end of the shift plunger 27.

The bicycle hub 39 is arranged to be mounted at one end on the planet carrier 8 by means of bearings 41, and at its other end by means of bearings 42 on the brake anchor 43. It is adapted to be rotated by a threaded clutch nut 44 mounted on the screw shaft portion 14 of the planet carrier 8. Since the remaining structure illustrated is the same as that shown and described in applicant's prior patent above cited, further description thereof is deemed unnecessary.

In operation, starting with the parts in the positions illustrated in Fig. 1, rotation of the driving member 15 in a clockwise direction as viewed from the left will cause the planet carrier 8 to be rotated in the same direction at reduced speed due to the fact that the sun gear 21 is held stationary by its engagement with the anchored bearing member 4. Its rotation causes the threads 14 of the planet carrier to move the nut 44 into clutching engagement with the hub 39 so as to rotate the hub at reduced speed as compared with the rotation of the driving member 15.

When the operator wishes to shift to high gear, he manipulates the lever 34 so as to shift plunger 27 to the right, thereby moving the sun gear out of engagement with the bearing member 4 and into engagement with the teeth 23 in the planet carrier 8. The drive member 15, planets 11, sun gear 21, and planet carrier 8, are thus locked together to rotate in unison, and the hub 39 is accordingly rotated, henceforth at the same rotational speed as the driving member 15.

The operation of the brake structure in coasting and braking is the same as set forth in the cited patent.

Although but one embodiment of the invention has been shown and described in detail, it will be understood that other embodiments are possible and changes may be made in the precise form and arrangement of the parts without departing from the spirit of the invention.

I claim:

1. In a two speed gear drive for bicycles, a stationary axle, a bearing member threaded thereon, an anchor member having a positive torque-transmitting connection with the bearing member, an anchor arm non-rotatably mounted on the anchor member having means for attachment to the frame of the bicycle for immobilizing the anchor member, a nut threaded on the axle adjacent the anchor member serving to secure the anchor arm on the anchor member and to clamp the anchor member against the bearing member, a planet carrier and clutch member journaled on the axle having a plurality of bearing studs, planet pinions journaled on said studs, a driving member rotatably mounted on the planet carrier having an orbit gear meshing with the planet pinions, a sun gear slidably journaled on the axle, meshing with the planet pinions; said bearing member and said planet carrier being formed for positive torque transmitting engagement with the sun gear; and means for shifting the sun gear axially for alternative engagement with the fixed bearing member or the planet carrier.

2. A two-speed gear drive for bicycles as set forth in claim 1 in which the axle has an axial bore and a radial slot communicating therewith, a shift block slidably mounted in said slot and having a swivel connection with the sun gear, a plunger traversing said bore and attached to the shift block, and means for actuating the plunger to shift the sun gear alternatively into clutching engagement with the bearing member and the planet carrier.

EDWIN ELLIOTT HOOD.

REFERENCES CITED

The following references are of record in the file of this patent:

FOREIGN PATENTS

| Number | Country | Date |
|---|---|---|
| 15,298 | Great Britain | July 5, 1906 |
| 745,104 | France | Feb. 7, 1933 |